(No Model.)
A. N. BAKER.
EYEGLASSES.
No. 565,420. Patented Aug. 11, 1896.
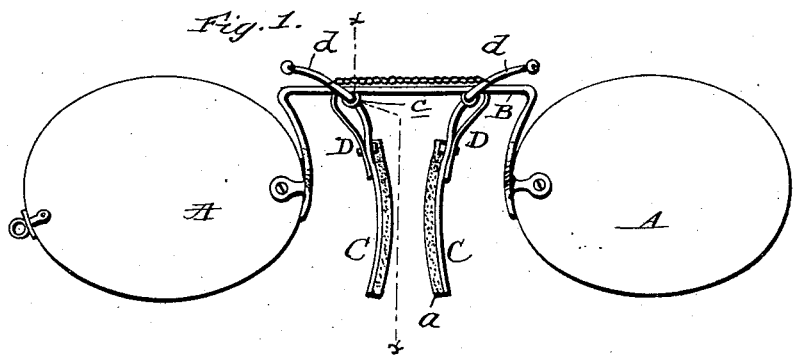
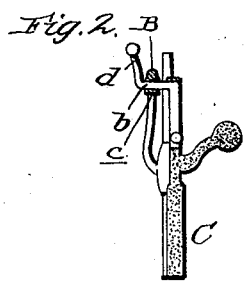
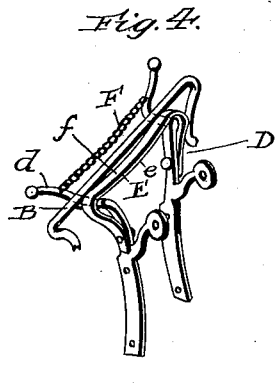
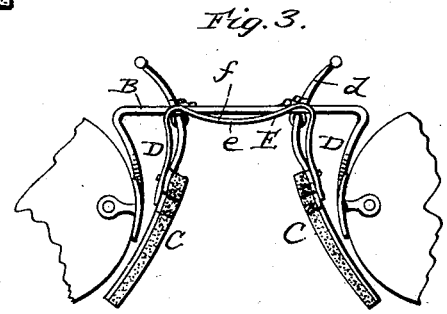
Witnesses:
Inventor
A. N. Baker
By James J. Sheehy
Attorney

UNITED STATES PATENT OFFICE.

ARTHUR NEWMAN BAKER, OF LOGANSPORT, INDIANA.

EYEGLASSES.

SPECIFICATION forming part of Letters Patent No. 565,420, dated August 11, 1896.

Application filed April 13, 1896. Serial No. 587,357. (No model.)

*To all whom it may concern:*

Be it known that I, ARTHUR NEWMAN BAKER, a citizen of the United States, residing at Logansport, in the county of Cass and State of Indiana, have invented certain new and useful Improvements in Eyeglasses; and I do declare the following to be a full, clear, and exact description of the invention, such as will enable others skilled in the art to which it appertains to make and use the same.

My invention relates to improvements in that class of eyeglasses which comprise a rigid bar for connecting the lenses or glasses and spring-pressed guards for holding the glasses on the nose, and its novelty and advantages will be fully understood from the following description and claims, when taken in conjunction with the accompanying drawings, in which—

Figure 1 is a front elevation of a pair of eyeglasses constructed in accordance with my invention. Fig. 2 is a transverse section taken in the plane indicated by the line $xx$ of Fig. 1. Fig. 3 is an enlarged detail front elevation illustrating the guards as moved apart to permit of the glasses being readily placed upon the nose; and Fig. 4 is a detail perspective view illustrating the bar for connecting the lenses or glasses, the guards, the spring for pressing the guards toward each other, and the chain for limiting the inward movement of the guards.

In the said drawings similar letters designate corresponding parts in all of the views, referring to which—

A indicates the lenses or glasses of a pair of eyeglasses.

B indicates the bar which rigidly connects the lenses or glasses A and may be connected directly thereto, as shown, or to frames (not illustrated) surrounding the lenses or glasses, and C indicates the guards, which are designed to hold the eyeglasses on the nose of the wearer. These guards are preferably of the shape illustrated, although they may be of any other desired shape, and they are preferably lined or covered on their inner sides with shell or other suitable substance $a$, as illustrated. The said guards C are provided at their upper ends with transversely-disposed portions $b$, which are journaled in suitable bearings $c$ in or on the bar B, and these transverse portions $b$ at their opposite, outer, or forward ends merge into the upwardly and outwardly directed finger-pieces $d$, which preferably have balls at their free ends, as shown, and in conjunction with the guards form levers D, as illustrated. In the embodiment of the invention illustrated the bearings $c$ of the bar B form the fulcrums of the levers D, but I would have it understood that the said levers D may be fulcrumed on the rigid bar in any manner suitable to the purposes of my invention.

E indicates the spring for pressing the guards C toward each other so as to enable them to grasp the nose of the wearer and thereby hold the glasses in position. This spring, which may be of a rectangular, circular, or other suitable form in cross-section, comprises the main portion $e$, which extends from the upper end of one guard to the upper end of the other guard and rests behind the bar B, as shown, and the depending portions $f$, which rest at the outer sides of the guards and are connected thereto by rivets or other suitable means. Such a spring, as will be readily appreciated, is capable of strongly pressing the guards toward each other is not liable on account of its form and arrangement to be broken or impaired by the frequent handling of the glasses, is capable of withstanding the strain incident to the frequent placing of the glasses on and removing them from the nose, and is to a great extent hidden by the rigid bar B, so as not to mar the appearance of the glasses.

F indicates the chain or flexible connection between the finger-pieces $d$ of the levers D. This connection is designed to hold the guards C apart and thereby prevent the spring E from spending its full force, and it also serves, by resisting the tendency of the spring to press the guards together, to hold both spring and guard tight and prevent any objectionable rattling of the same when the glasses are not in use. Said connection F further serves to hold the finger-pieces $d$ in such a position that they may be readily grasped and pressed toward each other, and, as will be readily seen, it enhances rather than detracts from the appearance of the glasses.

In placing the eyeglasses upon the nose it is simply necessary to press the finger-pieces $d$ toward each other with the thumb and forefinger, and when the glasses are in the proper position to release said finger-pieces, when the guards impinging against the sides of the nose will securely hold the glasses in position thereon. To remove the glasses, the finger-pieces $d$ are also pressed toward each other, when the guards will be moved apart and out of engagement with the nose of the wearer.

The bar B of my improved glasses will hold the lenses or glasses A perfectly rigid, and this is an important advantage, since it is necessary that the lenses should not move in any direction from the position in which they are fitted by the oculist, as their success depends on the exact position they occupy before the eyes.

It will further be observed that my improvements will hold the glasses very securely, although comfortably, on the nose, and that when the glasses are properly fitted by giving the guards C the desired shape the lenses will not be tilted when placed on the nose, but will be maintained the same pupilary distance in advance of the eyes at all times, which is an important advantage and a desideratum in this class of devices.

Having described my invention, what I claim is—

1. The pair of eyeglasses described, comprising the lenses or glasses, the rigid bar connecting the same, the levers having the transversely-disposed portions $b$, journaled in the rigid bar, the lower guard portions depending from the portions $b$, and the upper finger-pieces, and the spring, for pressing said guard portions against the nose, consisting of the portion $e$, resting behind the rigid bar, and upon the transverse portions $b$, of the levers, and the depending portions resting at the outer sides of the guard portions of the levers and secured thereto, substantially as specified.

2. The pair of eyeglasses described, comprising the lenses or glasses, the rigid bar connecting the same, the levers having the transversely-disposed portions $b$, journaled in the rigid bar, the lower guard portions depending from the portions $b$, and the upper finger-pieces, the spring, for pressing said guard portions against the nose, consisting of the portion $e$, resting behind the rigid bar, and upon the transverse portions $b$ of the levers, and the depending portions resting at the outer sides of the guard portions of the levers and connected thereto, and the flexible connection between the finger-pieces of the levers, substantially as and for the purposes set forth.

In testimony whereof I affix my signature in presence of two witnesses.

ARTHUR NEWMAN BAKER.

Witnesses:
 H. T. MANLOVE,
 S. W. BROWN.